United States Patent [19]

Nakahara et al.

[11] 4,088,388
[45] May 9, 1978

[54] O-TYPE OPTICAL WAVEGUIDE

[75] Inventors: Tsuneo Nakahara; Masao Hoshikawa, both of Yokohama; Satoshi Shiraishi, Osaka; Shiro Kurosaki, Osaka; Kunio Fujiwara, Osaka, all of Japan

[73] Assignee: Sumitomo Electric Industries, Ltd., Osaka, Japan

[21] Appl. No.: 708,640

[22] Filed: Jul. 26, 1976

Related U.S. Application Data

[62] Division of Ser. No. 406,112, Oct. 12, 1973.

[30] Foreign Application Priority Data

Oct. 13, 1972 Japan .................. 47-102839
Oct. 13, 1972 Japan .................. 47-102840

[51] Int. Cl.² ................................................. G02B 5/14
[52] U.S. Cl. ................................................. 350/96.30
[58] Field of Search ................................. 350/96 WG

[56] References Cited

U.S. PATENT DOCUMENTS 3,877,912   4/1975   Shiraishi et al. .......... 350/96 WG X

*Primary Examiner*—John K. Corbin
*Assistant Examiner*—Rolf Hille
*Attorney, Agent, or Firm*—Carothers and Carothers

[57] ABSTRACT

An O-type optical waveguide comprising a rod of fused silica having formed thereon a layer of doped fused silica having an index of refraction which is greater than that of the rod, and an outside layer of fused silica over the layer of doped fused silica. The surfaces between of doped silica, having the higher refractive index, and the low adjacent layers between which it lies are extremely smooth and clean or free from foreign particles thereby preventing scattering loss due to the inclusion of foreign particles.

2 Claims, 7 Drawing Figures

O-TYPE OPTICAL WAVEGUIDE

CROSS REFERENCE TO RELATED APPLICATION

This application is a division of pending U.S. patent application Ser. No. 406,112 filed Oct. 12, 1973 in Group 147 for Method for Manufacturing An Optical Waveguide.

BACKGROUND OF THE INVENTION

1. Field of the Invention

This invention relates to an optical waveguide of fused silica fiber having a cylindrical layer of high refractive index for use in an optical transmission system.

The optical waveguide of the present invention consists of a fused silica fiber of an extremely high light transparent material having a cylindrical layer of the same material, but higher in refractive index by several % at the most than that of the fused silica fiber interposed between the center and outer circumference of the fiber.

In such an optical waveguide, it is known that the dominant energy of the transmitted light is present in the thin cylindrical layer of higher refractive index.

The theoretical analysis of such an optical waveguide is reported by the technical paper No. 852 "Transmission Properties of the optical fiber having thin cylindrical layer of a higher refractive index than that of the fiber material" of the General Conference of 1972 and the technical paper No. 995 "The Transmission properties of $HE_{11}$ mode in the optical fiber which has a cylindrical thin layer of a higher refractive index than that of the fiber material" of the General Conference of 1973, of the Institute of Electronics and Communication Engineers of Japan.

2. Description of the Prior Art

For the manufacture of an optical waveguide of a fused silica fiber having a thin cylindrical layer of higher refractive index in it, a method has been known in which either a transparent fused silica rod is inserted inside a transparent fused silica tube which has a cylindrical uniform layer of high refractive index attached to its inner surface, or a transparent rod which has a cylindrical uniform layer of high refractive index attached to its outer surface is inserted coaxially inside a transparent fused silica tube and the end portions of them are heated to the melting point thereof and drawn to a fiber with a constant drawing speed.

With an optical waveguide manufactured in this way, however, there takes place an inevitable scattering loss of light at the inner or outer surfaces of the cylindrical thin layer of higher refractive index owing to the roughness of the interfaces of the cylindrical thin layer or owing to the inclusion of air and foreign matter which occasionally comes to exist between the thin layer and the rod or tube during manufacture.

SUMMARY OF THE INVENTION

It is an object of this invention to provide a new and improved optical transmission line of a fused silica fiber having a cylindrical layer thereon of fused silica having a higher refractive index than that of the fiber, whereby one can very economically obtain an optical waveguide with very low transmission loss by eliminating the scattering loss of light at the interfaces of the cylindrical layer of high refractive index with the materials of lower refractive index.

According to the teachings of the present invention, an optical fiber is provided in which, before attaching a uniform layer of fused silica having a high refractive index to the inner surface of the cylindrical tube or the outer surface of the rod, the surfaces are polished smooth and clean, then a uniform layer of pure fused silica is provided on the surfaces and a uniform layer of material having a high refractive index is deposited on the uniform layer of pure fused silica, and then a uniform layer of pure fused silica is deposited on the uniform layer of material having a high refractive index so as to protect the surface of the deposited layer of high refractive index, and the rod and tube treated as mentioned above are positioned coaxially with respect to each other and heated to the melting point thereof and drawn to a filament to form an optical fiber having a cylindrical uniform layer of higher refractive index. The optical fiber of the present invention successfully removes the roughness at the interfaces of the cylindrical layer of high refractive index and air and foreign matter which come to exist during the manufacturing process at the interfaces of the cylindrical layer. Thus, the scattering loss of the light is greatly reduced and the light transmission loss of such an optical fiber is also greatly reduced.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE INVENTION

Figure 1:
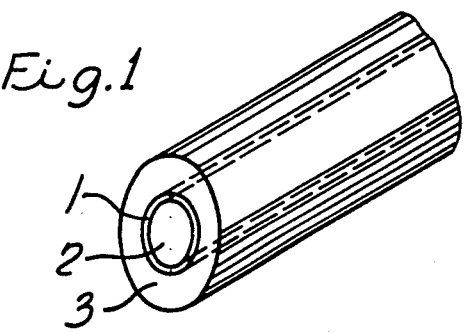
FIG. 1 is a view in oblique projection showing an example of an optical waveguide having a cylindrical layer with a high refractive index.

In FIG. 1, reference numeral 1 denotes the cylindrical layer of fused silica having a higher refractive index than that of the fused silica fiber composing the optical waveguide, reference numeral 2 the light transparent inner part of the optical fiber, and reference numeral 3 the light transparent outer part. Manufacturing methods of an optical waveguide as shown in FIG. 1 will be hereinafter explained.

Figure 2:
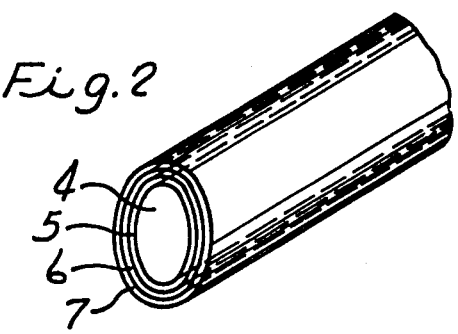
FIGS. 2 and 3 are views in oblique projection of a rod and a tube of fused silica respectively for explanation of an example of the method of manufacturing an optical waveguide of the present invention.

FIG. 2 is an oblique view of a transparent rod of pure fused silica sheathed by three thin layers, from inside to outside respectively, of a fine powder of pure silica, a fine powder of purely doped silica of high refractive index and a fine powder of pure silica.

In FIG. 2, reference numeral 4 denotes the transparent rod, 5 and 7 cylindrical layers of the fine powder of pure silica, and 6 a cylindrical layer of a fine powder of purely doped silica of high refractive index.

In the manufacturing method of the present invention, the surface of the rod 4 is polished to be smooth and clean by optical polishing and flame polishing, etc. On the polished surface of the rod 4 a uniform thin layer 5 of fine powder of pure silica produced by oxidizing silicontetrachloride is applied to a thickness from several microns to several tens of microns. Then a fine powder layer 6 of pure silica containing one or more metal oxides, for example $TiO_2$ in an amount of several percent deposited in a similar way to make layer 6 on the layer 5.

The thickness of the layer 6 is also made to be from several microns to several tens of microns.

A layer 7 of fine powder of pure silica is further deposited in a similar way to make a layer whose thickness is nearly equal to the thickness of the layer 5.

After the above-mentioned processes, a rod as shown in FIG. 2 is obtained.

Figure 3:
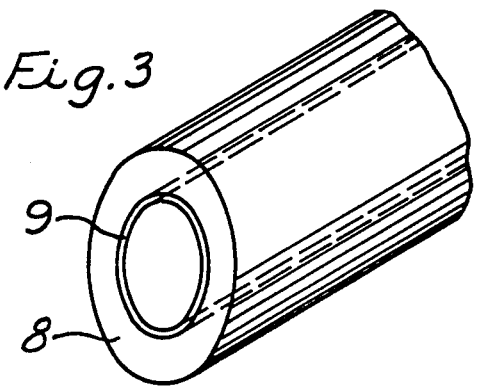

FIG. 3 shows an oblique view of a transparent tube of the same material of the rod 4 which has a deposited layer on the inner surface thereof.

In FIG. 3, reference numeral 8 denotes a transparent tube whose dimensions of inner diameter and thickness must be determined in relation to the dimensions of a rod such as shown in FIG. 2 so that the optical fiber made by drawing the rod and tube in the subsequent process has the requisite dimensions of cross section. Reference numeral 9 denotes a layer of a fine powder of pure silica which is produced in a similar way as was done to make layer 5 of FIG. 2.

In the subsequent process, the rod as shown in FIG. 2 and the tube as shown in FIG. 3 are heated to approximately a temperature of nearly 1500° C to sinter the layers of fine powder of quartz 5, 6, 7, and 9 in an oxygen-rich atmosphere.

Figure 4:
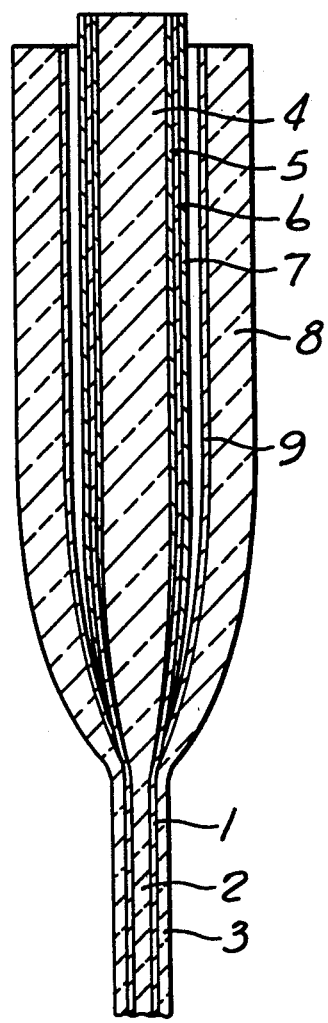
FIG. 4 is a view in longitudinal section of an optical waveguide presented for the purpose of explaining the manufacturing method of the present invention.

Then, as shown in FIG. 4, the rod of fused silica 4 is inserted coaxially in the tube of fused silica 8 and placed in a high temperature furnace. They are heated to a high temperature of approximately 1900° C to their melting point and are drawn into the form of a filament, in other words are spun, to produce an optical waveguide of a requisite size and shape.

FIG. 4 shows a longitudinal section of the rod 4 and tube 8 which are spun under a high temperature.

In FIG. 4, the reference numerals 1, 2 and 3 show the same parts as shown in FIG. 1.

The optical waveguide thus manufactured has a shape as shown in FIG. 1 and has the undermentioned relationship between the refractive indexes $n_4$, $n_5$, $n_6$, $n_7$, $n_8$, and $n_9$ for parts 4, 5, 6, 7, 8 and 9, respectively, wherein $n_4 = n_5 = n_7 = n_8 = n_9$, $n_6 > n_4$.

As a result, the layer 6 of pure silica containing one or two metal oxides makes a cylindrical thin layer 1 of higher refractive index $n_6$ by several % than the refractive index $n_4$ or any of the others in the interior of the optical waveguide.

Then, the layer 5 of pure silica and the rod 4 of fused silica are integrated into one body and made into the transparent rod 2 inside of the layer 1, while the layers 7 and 9 of pure silica and the tube 8 of fused silica are integrated into one body and made into the transparent tube 3 outside of the layer 1.

In the manufacturing method of the present invention, if the addition of $TiO_2$ to the pure silica powder of layer 6 is precisely controlled to a requisite amount, an optical waveguide having a cylindrical layer 1 of an ideal refractive index $n_6$ is successfully obtained.

The thickness of the layer 6 of the optical waveguide is made from one-severalths to one-several tenths of the transmitted wavelength.

In the process mentioned above, the layer 9 on the inner surface of the tube 8 is not necessary, if the thickness of the layer 7 on the rod 4 is made thicker. One can obtain the same type optical fiber from a rod having the layer 7 of fused silica as thick as the tube 8.

Figure 5:
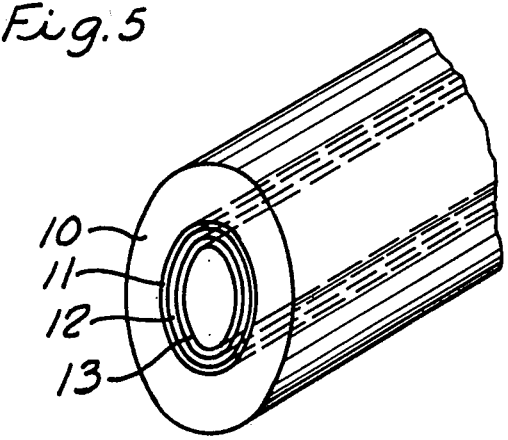
FIGS. 5 and 6 are views in oblique projection of a rod and tube of fused silica respectively for explanation of another example of the present invention.
Figure 6:
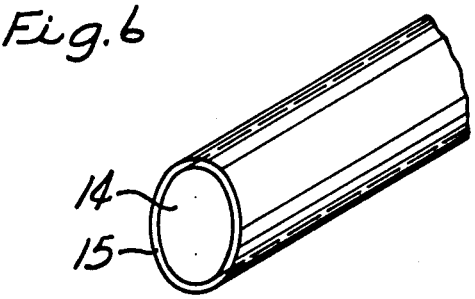

An optical waveguide of a cylindrical shaped film may also be obtained in a similar way as mentioned above by the following method explained by reference to FIGS. 5, 6 and 7. In this method, a thin cylindrical layer 11 of a fine powder of pure silica, a thin cylindrical layer 12 of a fine powder of pure silica containing such an oxide as $TiO_2$ and a thin cylindrical layer 13 of a fine powder of pure silica are deposited in turn one upon another on the inner surface of the tube 10 of fused silica. These deposited layers 11, 12 and 13 are prepared in the same way as layers 5, 6 and 7 are deposited on the surface of the rod 4. Likewise the layer 15 of a fine powder of pure silica is prepared on the outer surface of the rod 14 which is shown in FIG. 6.

Figure 7:
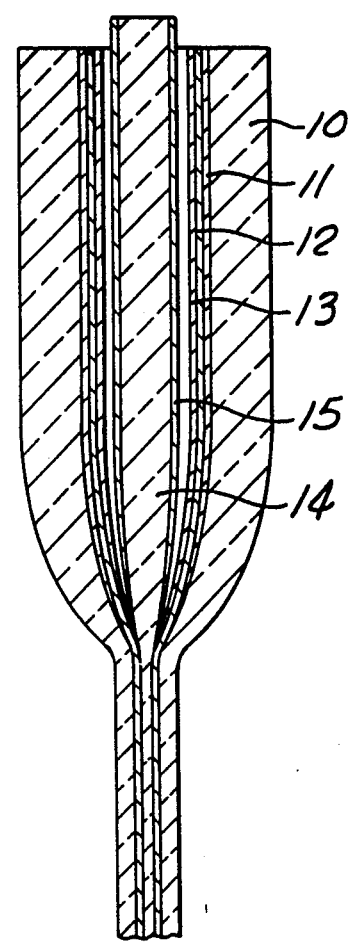
FIG. 7 is a view in longitudinal section of an optical waveguide presented for the purpose of explaining another example of the present invention.

As shown in FIG. 7, the tube 10 and rod 14 are heated in a furnace to sinter the layers. Then being so treated, tube 10 and rod 14 are inserted coaxially of each other and heated to a high temperature of about 1900° C and then are spun to a filament which composes an optical waveguide having cross sectional parts 1, 2 and 3 as shown in FIG. 1. The light transmission properties of a fibrous optical waveguide obtained in the afore-mentioned way can be improved by giving it a suitable heat treatment. For example, a fiber obtained in the aforementioned way is then heated to about 800° C for several hours and its surface is made clean by etching and polishing with HF acid in order to strengthen the fiber.

As a metallic oxide to be contained in the fine powder of purely doped silica of the layer 6 or 12, tantalum oxide, tin oxide, niobium oxide, zirconium oxide, aluminum oxide, ytterbium oxide, lanthanum oxide, cesium oxide, rubidium oxide, germanium oxide, etc., which are oxides that belong to III, IV and V atom groups, may also serve the purpose besides $TiO_2$.

In the manufacturing method of the present invention, the thin layers of pure silica are interposed between the layer of purely doped silica having a high refractive index and the rod or tube of quartz, and are so melted and integrated to one body with the rod or tube during the spinning process so that the inner and outer surfaces of the layer of high refractive index are extremely smooth and clean due to the layers of pure silica, even if convexities and concavities on the surfaces of the rod and tube have not been sufficiently removed by polishing.

In consequence, the roughness of the surface of the rod and tube is covered up and eliminated by the interposed layers of pure silica, so that the effects of a smooth surface of the rod and tube can be obtained. It is, therefore, not necessary to carry out precise polishing of the surfaces of the rod and tube.

The present invention makes it possible to manufacture without difficulty an optical waveguide which has a very low light transmission loss due to the small scattering loss at the interfaces with a cylindrical thin layer of higher refractive index.

The O-type optical waveguide of the present invention can also be produced by supplying three kinds of fused glass of the proper index of refraction, one over the other, instead of making these layers by depositing layers of glass powder one over the other.

We claim:

1. An optical waveguide comprising a rod of fused silica having formed thereon a layer of doped fused silica having an index of refraction which is greater than that of said rod, and an outside layer of fused silica over said layer of doped fused silica the surfaces between said layers being extremely smooth and clean.

2. The optical waveguide of claim 1 including a layer of undoped fused silica disposed between the surfaces of said rod and said layer of doped fused silica.

* * * * *